June 22, 1954 P. G. KAPPUS 2,681,548
REVERSIBLE THRUST NOZZLE FOR JET ENGINES
Filed Oct. 27, 1948 2 Sheets-Sheet 1
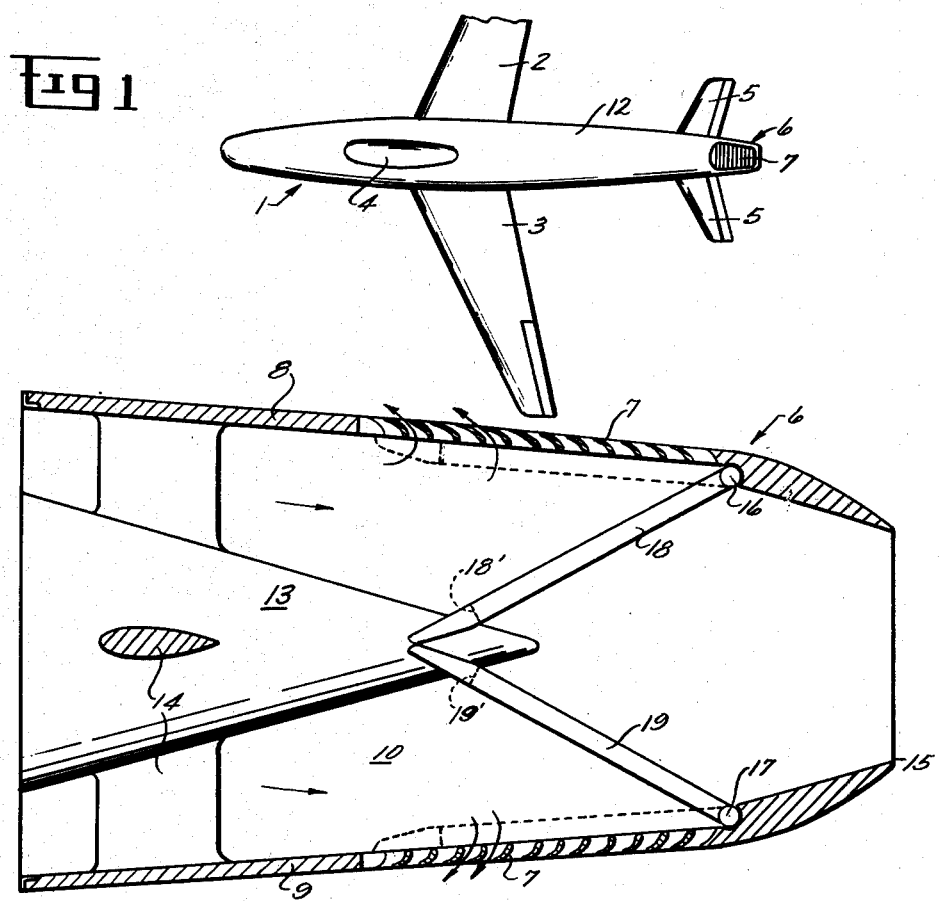
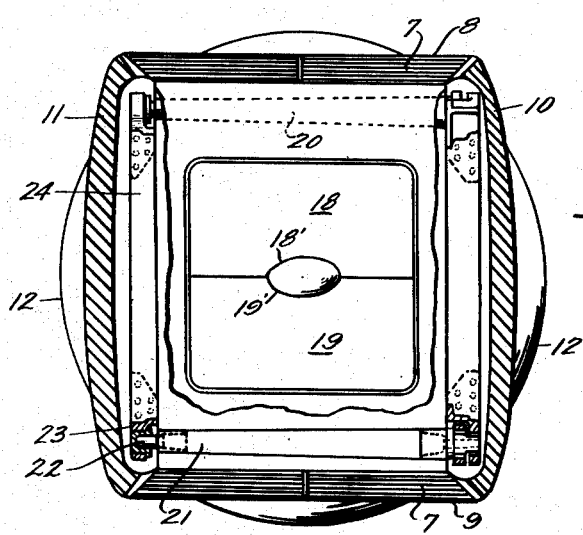
INVENTOR.
PETER G. KAPPUS
BY Wade Koontz
ATTORNEY and
Charles L. Burgoyne
AGENT

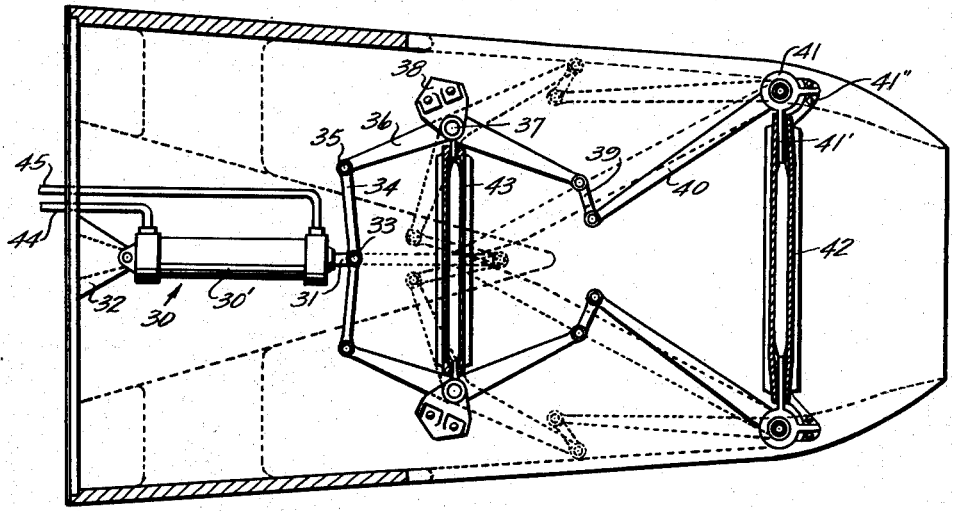
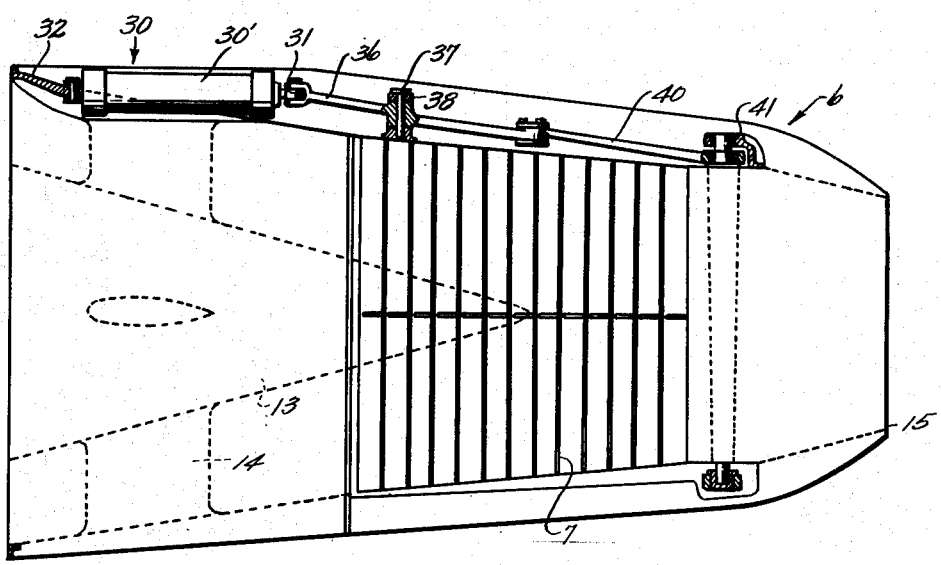

Patented June 22, 1954

2,681,548

UNITED STATES PATENT OFFICE 2,681,548

REVERSIBLE THRUST NOZZLE FOR JET ENGINES

Peter G. Kappus, Munich, Germany

Application October 27, 1948, Serial No. 56,882

8 Claims. (Cl. 60—35.54)

(Granted under Title 35, U. S. Code (1952), sec. 266)

The invention described herein may be manufactured and used by or for the United States Government for governmental purposes without payment to me of any royalty thereon.

The present invention relates to a reversible thrust nozzle for jet engines particularly adapted to produce a braking effect on an aircraft having a jet engine for producing forward propulsive effort.

The primary object of the invention is to provide an exhaust nozzle for a jet engine or turbojet engine used to propel an aircraft and to provide means for alternatively directing the exhaust jet in a direction opposite to the forward motion of the aircraft to propel the same or in a direction the same as the forward motion of the aircraft to retard the same. At the same time it is a related object to provide a reversible thrust nozzle for a jet engine in which the braking effect produced by reversing the direction of thrust may be varied within wide limits.

A further object of the invention is to provide a reversible thrust nozzle for jet engines wherein the nozzle is provided with thrust reversing louvers or outlets adapted to be closed by movable gates or closures in one position of said closures or adapted to be opened in another position of said closures for effecting reversal of the thrust.

Another object of the invention is to provide a reversible thrust nozzle for jet engines wherein the nozzle is provided with thrust reversing louvers and wherein closure means movably mounted adjacent to the louvers are adapted to close the louvers in one extreme position and are adapted to close the normal jet nozzle opening in the other extreme position.

Another object of the invention is to provide a reversible thrust nozzle for jet engines wherein movable gates or closure means for making the reversing action effective or ineffective are operated by an improved closure operating linkage or mechanism.

The above and other objects of the invention will become apparent upon reading the following detailed description in conjunction with the accompanying drawings, in which:

Fig. 1 is a top plan view of a jet-propelled airplane having the present reversible thrust exhaust nozzle at the rear end of the airplane fuselage.

Fig. 2 is a vertical cross sectional view of the present reversible thrust exhaust nozzle.

Fig. 3 is a rear elevation view of the nozzle with portions of the surrounding structure cut away to show details of the structure.

Fig. 4 is a side elevation view of the present reversible thrust exhaust nozzle showing the thrust reversing mechanism in plan view.

Fig. 5 is a top plan view of the present reversible thrust nozzle with portions of the outer casing removed to show the thrust reversing mechanism in edge view.

While it is well-known that airplanes may be provided with various types of braking devices and arrangements to retard forward motion, there is still room for improvement in such devices. In landing high-speed jet-propelled airplanes it is especially desirable to provide a simple and effective means to retard forward motion, thus enabling the airplane to come to a stop in a reasonable distance after landing. One example might be in landing on an aircraft carrier where the length of the landing field is limited by the length of the vessel. The same situation would arise in landing on small emergency air strips on land.

Considering Fig. 1 there is shown an airplane 1 having swept back wings 2 and 3, canopy 4, tail surfaces 5 and exhaust nozzle 6. As will become more obvious as the description proceeds the nozzle forms an outlet for the discharge of products of combustion emanating from a turbo-jet engine carried within the airplane fuselage or otherwise mounted on the aircraft to extend in a generally fore-and-aft direction. The hot gases normally flow directly rearwardly of the airplanes in a continuous stream, but by directing the gases laterally and forwardly through louvers 7 in the top and bottom walls of the aircraft fuselage the hot gases resulting from combustion and expansion in the engine can be made to reverse the direction of thrust effect and thus retard the forward motion of the aircraft very effectively. The details of the jet engine itself are not shown in the drawings since they form no part of the present invention. However one example of the type of engine having an exhaust nozzle for discharging a large volume of exhaust gas and producing forward thrust by reaction effect may be seen pictured opposite page 22 of "Jet Propulsion Progress" (First edition, 1948) by Leslie E. Neville. In this example the exhaust nozzle appears at the extreme right hand end of the drawing referred to in the above volume. Similarly in the present drawings the nozzle is shown opening toward the right hand side of the sheets and the gas flow therethrough will normally be in a direction from left to right. It might be noted that the engine receives air through one or more intake openings provided in the airplane fuselage, usually near the point where the leading edges of the wings join the fuselage.

For a more detailed illustration of the nozzle structure reference may be had to the drawings wherein Fig. 2 shows an exhaust nozzle in the form of a hollow casing or housing generally tubular in form and having top and bottom walls 8 and 9 and side walls 10 and 11. These walls are smoothly faired into the fuselage structure 12 which is more or less circular in cross section. Extending rearwardly inside the nozzle is an exhaust cone or bullet 13, which is supported centrally of the structure by means of transverse struts 14 of streamline cross sectional shape fixed both to the cone and to the walls of the nozzle structure. The walls 8 to 11 converge to form a nozzle mouth or outlet 15 from which the gaseous products of combustion of the jet engine may issue into the free atmosphere rearwardly of the airplane. The top and bottom walls 8 and 9 of the nozzle structure are provided with louvers or spaced guide vanes 7, having an angular setting calculated to direct gases issuing therefrom in a generally forwardly direction to exert a braking action on the forward movement of the aircraft. Pivotally mounted at 16 and 17 there is a pair of doors or gates 18 and 19 which may be set in the position shown (solid lines) to direct the flowing engine exhaust gases through the louvers 7, or which may be set in the other extreme position (dotted lines) to close the louvers 7 and simultaneously leave the gases free to flow rearwardly from the nozzle mouth 15. As may be seen in Figs. 2 and 3 the free edges of the gates 18 and 19 are notched out at 18' and 19' so as to receive the free end of the exhaust cone 13. While the gates can be mounted far enough to the rear of the nozzle so as not to touch the cone on moving to the closed abutting position, the arrangement disclosed in the drawings is preferred for the reason that is is more compact. The gates perform their function without being required to move through a large arc or range, since the angular difference between the two relative positions as shown is only about 30°. Moreover by the arrangement shown the hot gases flowing rearwardly are divided by the gates in the thrust reversing position thereof (solid lines) and directed through the louvers 7 in two equal volumes. Furthermore the gates may be set in various intermediate positions so as to maintain flow from the mouth 15 and from the louvers 7 at the same time, to give various degrees of braking action. However it must be realized that as the gas volume through the nozzle mouth 15 is reduced, the volume issuing from the louvers increases proportionately. The mass flow relations are thus dependent on each other, according to the instant setting of the gates 18 and 19. In the position of the gates as shown in Figs. 2, 3 and 4 all the hot gases are directed into the louvers 7 and none is available for exerting normal forward thrust by direct rearward flow from the nozzle mouth 15. This position of the gates 18 and 19 will give the maximum braking effect and will be used only after the aircraft has attained a high forward speed and is in the process of being retarded, as for instance on landing. Because of the pressure on the gates 18 and 19 the flowing gases will maintain these elements in the abutting relation as shown and considerable force will be required to move the gates away from this position and toward the louver-closing position shown in dotted lines (Fig. 2). However only the initial movement will require a large force, since further movement will decrease the angle between the gates and the gas flow thus reducing the component of force normal to the gates. Once the gates have reached the louver-closing position the gaseous pressure within the nozzle will tend to maintain the gates in this position and thus effectively close off the louvers 7. Another feature of importance is the equal displacement of both gates at all times, so that there will be no unbalance due to more gas flowing from one set of louvers than from the opposite set.

As shown in Fig. 3 the gates 18 and 19 have stiffening bars 20 and 21 fixed thereto and providing pivots or trunnions 22 rotatably fitting in fixed bearings 23 mounted on vertical bars 24 carried interiorly of the nozzle structure. The bars 20 and 21 are of tapered form, with the gate operating mechanism being located at the larger ends of the bars where maximum torque is exerted on the bars in turning the gates. The walls of the nozzle are preferably made of spaced apart inner and outer sheet metal walls, although for purposes of illustration the walls are shown as formed of a single layer of material.

In order to operate the gates 18 and 19 in the manner above outlined a linkage and servomotor are provided, which are preferably mounted between the inner and outer walls of the nozzle structure. In any event the operating mechanism is shown in Figs. 4 and 5, and includes a servomotor 30 which may be a hydraulically operated device including a cylinder 30' having a piston and a connecting rod 31 movable therein. The cylinder 30' is pivotally mounted on a bracket 32 fixedly mounted on the nozzle wall or adjacent portions of the aircraft fuselage. The connecting rod 31 extends rearwardly and is pivotally connected at 33 to a pair of oppositely-extending similar links 34, having their outer ends pivoted at 35 to a pair of similar bellcranks 36. The bellcranks are pivoted at 37 to a pair of brackets 38 fixed on the nozzle wall. The aft ends of the levers or bellcranks 36 have pivoted thereto a pair of similar drag links 39, which are in turn pivotally connected to a pair of similar gate actuating arms 40. The arms 40 are fixed at their other ends to the larger ends of the gate bars 20 and 21 for actuation of the gates in response to operation of the hydraulic servomotor 30. The ends of the bars 20 and 21 having the arms 40 attached thereto are journaled in bearing brackets 41, each of which includes an attaching arm 41' adapted to fit within a channel member 42. The channel member is fixed to the nozzle wall with its open side down and is attached by welding or otherwise securing the oppositely extending flanged edges of the channel to the wall. The attaching arms 41' may be secured within the channel in any suitable manner as for instance by welding or bolting. The bearing brackets 41 are additionally secured to the nozzle wall as indicated at 41''. The brackets 38 are similarly secured both to the nozzle wall and to a channel member 43 secured to the nozzle wall. These channels help to stiffen the wall and take up some of the stresses imposed on the nozzle wall by the gate operating mechanism. It is understood that the whole operating mechanism, including the servomotor 30, is preferably covered by an outer jacket of sheet metal forming the outer layer of a double walled nozzle structure. The cylinder 30' of the servomotor 30 has hydraulic conduits 44 and 45 connected at opposite ends to admit hydraulic fluid selectively to either end of the cylinder and thus effect movement of the connecting rod 31.

The gate operating mechanism is shown in Fig. 4 in the position corresponding to nozzle-closing or louver-opening position of the gates 18 and 19, as in Fig. 2 (solid lines). In order to move the gates back to or toward the louver-closing position a large force will be required because of the gas pressure on the gate surfaces.

However the first portion of the rearward movement of connecting rod 31 will cause very little movement of bellcrank levers 36 because of the angular relation between the connecting rod 31 and the links 34. Thus a large force or leverage will be available to move the gates out of the nozzle closing position. After some of the gases begin to escape between the gates and out of nozzle mouth 15, the force required for further movement of the gates will be reduced. At the same time the angle between connecting rod 31 and links 34 will now be smaller and the leverage will be reduced accordingly. Therefore as the force against the gates is reduced the force exerted by the operating mechanism is reduced and the rate of movement of the gates is increased, for an equal rate of fluid delivery to the cylinder 30' by way of conduit 44. The operating mechanism finally reaches a position corresponding to the nozzle-open position of the gates, the mechanism being shown in dotted lines for this other extreme position. By proper arrangement of a displacement indicator in the airplane cockpit the pilot may select a setting of the gates to achieve a desired result at any time. Thus if only moderate braking action or reverse thrust is desired he will move the gates 18 and 19 to a position where they will be only slightly spaced from the louvers 7. If more braking action or retarding is required then further movement of the gates toward the nozzle closing position will be required. The completely closed nozzle as in Fig. 2 will be required mostly in coming to a quick stop in a short landing run.

The structural arrangement of the louvers 7 may be varied considerably in numerous ways. If desired the vanes may be made adjustable so as to vary the angle of escape of the combustion gases. The vanes themselves may have various degrees of curvature depending on performance characteristics desired. For instance with the guide vanes secured in fixed positions the gases may be made to escape in a sidewise or lateral direction instead of toward the forward end of the airplane as contemplated by the arrangement shown in the drawings. In this case the action of the flowing gases will reduce the overall engine thrust to the vanishing point by a spoiling action on the gas flow, as well as by a reduction in the volume of gases escaping by way of the nozzle mouth 15. The use of flow spoilers located rearwardly of the nozzle to achieve a braking effect is now well known, as shown by illustrations and descriptive matter on pages 102 and 103 of "Gas Turbines and Jet Propulsion for Aircraft" (Fourth edition, 1946) by G. Geoffrey Smith. It is also emphasized that the present reversible thrust nozzle for jet engines may be applied on engines located in outboard nacelles, just as well as in engines completely housed within the airplane fuselage. While it is preferred to provide the discharge louvers 7 in the top and bottom walls 8 and 9 of the nozzle, an alternative form of structure is one where the louvers are provided in the opposite side walls 10 and 11 of the nozzle structure. However for purposes of defining the invention the four walls 8 to 11 inclusive may each be termed a side wall, since each forms a side of the box-like casing or housing making up the exhaust nozzle 6.

The embodiments of the invention herein shown and described are to be regarded as illustrative only and it is to be understood that the invention is susceptible to variations, modifications and changes within the scope of the appended claims.

I claim:

1. In an airplane having a turbo-jet engine carried thereon and normally discharging exhaust gases in a direction rearwardly of the airplane, a reversible thrust exhaust nozzle for said engine comprising a housing structure of generally tubular form having an open forward end to receive exhaust gases from the engine and having an open aft end to permit flow of said gases from said nozzle into the free atmosphere rearwardly of the airplane, a series of louvers in opposite side walls of said housing structure and including curved guide vanes positioned to direct exhaust gases outwardly and forwardly, a pair of gates within said housing structure, means pivotally mounting one end of each gate contiguous with respect to said opposite side walls so that said gates may be swung against said walls to form cover means for said louvers, said gates extending forwardly from said pivotal mounting means and being adapted to swing toward each other to uncover said louvers and simultaneously reduce the cross sectional area of the free passage through said nozzle from the forward open end toward the aft open end thereof, and actuating means for effecting equi-angular displacements of said gates at all times away from the louver-covering positions thereof.

2. In a jet-propelled aircraft, a jet exhaust nozzle comprising a housing structure of generally tubular form having an open forward end to receive exhaust gases and having an open aft end to permit flow of said gases from said nozzle into the free atmosphere rearwardly of the aircraft, means providing a multiplicity of gas discharge openings in opposite side walls of said housing structure, a pair of gates within said housing structure, means pivotally mounting one end of each gate adjacent to an opposite side wall so that said gates may be swung against said walls to form cover means for said gas discharge openings, said gates extending toward the forward end of said nozzle from said pivotal mounting means and being adapted to swing toward each other to uncover said gas discharge openings, the free end portions of said gates being adapted to contact each other along a central plane of said nozzle when swung toward each other and thus close the free passage through said nozzle from the open forward end to the open aft end thereof, and actuating means for effecting equi-angular displacements of said gates at all times away from said side walls.

3. An exhaust nozzle as recited in claim 2 wherein the actuating means comprises, a hydraulic cylinder having a piston and connecting rod movably mounted therein, a pair of links connected to said connecting rod and extending laterally therefrom in opposite directions, a pair of bellcrank levers connected to said links, means connecting said bellcrank levers and said gates, and said connecting rod and links being arranged for a maximum angle therebetween in the contacting positions of said gates.

4. In an airplane having a turbo-jet engine carried thereon and normally discharging exhaust gases in a direction rearwardly of the airplane, an exhaust nozzle for said engine comprising a housing structure of generally tubular form having an open forward end to receive exhaust gases from the engine and having an open aft end to permit flow of said gases from said nozzle into the free atmosphere rearwardly of the airplane, a series of louvers in two opposite side walls of said housing structure and including curved guide vanes positioned to direct exhaust gases outwardly and forwardly, a pair of gates each pivotally mounted within said housing structure adjacent to said opposite side walls and adapted to form cover means for said louvers in one position, each of said gates extending forwardly from the pivotal mounting thereof and being adapted to swing toward each other to uncover said louvers and simultaneously reduce the cross sectional area of the free passage through said nozzle from the open forward end to the open aft end thereof, and actuating means for effecting equi-angular displacements of said gates at all times away from the louver-covering positions thereof whereby said gates will contact each other at their outer free edges along a line lying in a central longitudinal plane of said airplane.

5. An exhaust nozzle as recited in claim 4 wherein the actuating means comprises, a hydraulic cylinder having a piston and connecting rod movably mounted therein, a pair of links connected to said connecting rod and extending laterally therefrom in opposite directions, a pair of bellcrank levers connected to said links, means connecting said bellcrank levers and said gates, and said connecting rod and links being arranged for a maximum angle therebetween in the contacting positions of said gates.

6. In a jet-propelled aircraft, a jet exhaust nozzle comprising a housing structure of generally tubular form having an open forward end to receive exhaust gases and having an open aft end to permit flow of said gases from said nozzle into the free atmosphere rearwardly of the aircraft, means providing a multiplicity of gas discharge openings in opposite side walls of said housing structure, a pair of gates within said housing structure, means pivotally mounting one end of each gate adjacent to an opopsite side wall so that said gates may be swung against said walls to form cover means for said gas discharge openings, said gates extending toward the forward end of said nozzle from said pivotal mounting means and being adapted to swing toward each other for free end contact along a central plane of said nozzle, actuating means for effecting equi-angular displacements of said gates at all times including a hydraulic servomotor having a piston movable in said central plane, a pair of similar pivotally mounted bellcrank levers equally spaced laterally from said central plane, link means connecting one end of each bellcrank lever with said piston, actuating arms rigidly connected to said gates at their pivotal axes, and means connecting said arms and the other ends of said bellcrank levers.

7. In a jet-propelled aircraft having a jet exhaust nozzle of generally tubular form within which is pivotally mounted a pair of gates extending generally forwardly from their pivotal axes and which are adapted to alternately cover and uncover side openings in said nozzle as said gates are swung away from or toward each other respectively, a servomotor system for effecting equi-angular displacements of said gates at all times comprising, a servomotor having a reciprocably mounted actuator movable on a central plane of said nozzle midway between said pair of gates, a pair of similar pivotally mounted bellcrank levers equally spaced laterally from said central plane, link means connecting one end of each bellcrank lever with said actuator, actuating arms rigidly connected to said gates at their pivotal axes, and means connecting said arms and the other ends of said bellcrank levers, whereby a maximum leverage effect on said gate movement is obtained when said gates are closest together by providing a maximum angularity between said actuator and said link means at the same time.

8. In a jet-propelled aircraft having a jet exhaust nozzle of generally tubular form within which is pivotally mounted a pair of gates extending generally forwardly from their pivotal axes and which are adapted to alternately cover and uncover side openings in said nozzle as said gates are swung away from or toward each other respectively, a servomotor system for effecting equi-angular displacements of said gates at all times comprising, a servomotor having a reciprocably mounted actuator movable on a central plane of said nozzle midway between said pair of gates, actuating arms rigidly connected to said gates at their pivotal axes, and link and lever connecting means between respective actuating arms and said actuator arranged with respect to said actuator to provide a maximum leverage effect on the movement of said gates when said gates are closest together.

References Cited in the file of this patent

UNITED STATES PATENTS

| Number | Name | Date |
| --- | --- | --- |
| 141,039 | Dow | July 22, 1873 |
| 514,527 | Wauters | Feb. 13, 1894 |
| 543,182 | Hunt | July 23, 1895 |
| 958,996 | Duc | May 24, 1910 |
| 2,400,044 | Hermanson | May 7, 1946 |
| 2,418,488 | Thompson | Apr. 18, 1947 |
| 2,481,330 | Neal | Sept. 6, 1949 |

FOREIGN PATENTS

| Number | Country | Date |
| --- | --- | --- |
| 580,995 | Great Britain | Sept. 26, 1946 |